United States Patent [19]
Mizuno

[11] Patent Number: 5,445,017
[45] Date of Patent: Aug. 29, 1995

[54] MOTOR START EXAMINING DEVICE AND METHOD

[75] Inventor: Masayuki Mizuno, Osaka, Japan

[73] Assignee: Mita Industrial Co., Ltd., Japan

[21] Appl. No.: 289,228

[22] Filed: Aug. 12, 1994

[30] Foreign Application Priority Data

Aug. 24, 1993 [JP] Japan .................................. 5-209185
Aug. 24, 1993 [JP] Japan .................................. 5-209186

[51] Int. Cl.⁶ .......................................... G01N 15/00
[52] U.S. Cl. ................... 73/118.1; 388/921; 318/567
[58] Field of Search ................ 388/921, 933; 73/118.1

[56] References Cited

U.S. PATENT DOCUMENTS

| | | | |
|---|---|---|---|
| 4,639,649 | 1/1987 | Seto ....................................... | 318/314 |
| 4,796,035 | 1/1989 | Kawasaki et al. .................... | 346/108 |
| 4,809,025 | 2/1989 | Noguchi ................................ | 346/154 |
| 4,894,669 | 1/1990 | Sugiura et al. ....................... | 346/160 |
| 4,904,917 | 2/1990 | Hakluytt ............................... | 318/696 |
| 4,975,626 | 12/1990 | Yagi et al. ............................ | 318/567 |
| 5,206,699 | 4/1993 | Stewart et al. ....................... | 356/30 |

*Primary Examiner*—Richard Chilcot
*Assistant Examiner*—Eric S. McCall
*Attorney, Agent, or Firm*—Beveridge, DeGrandi, Weilacher & Young

[57] ABSTRACT

The present invention is suitable for examination of the rotating state of a Polygonal mirror motor in an image forming apparatus. It is judged whether or not the rotational speed of the motor is a target speed until a first time period has elapsed since the supply of power to the motor for rotating a Polygonal mirror was started every other second time period sufficiently shorter than the first time period and continuously checked over a third time period which is sufficiently shorter than the second time period. If it is judged that the rotational speed of the motor is the target speed continuously for the third time period, it is judged again whether or not the rotational speed of the motor is the target speed after an elapse of a fourth time period since the judgment. If the rotational speed of the motor is the target speed, the motor outputs a signal indicating that the motor is stabilized at the target speed. If the rotational speed of the motor is not the target speed, the motor further waits until a fifth time period has elapsed for judging whether or not the rotational speed of the motor is the target speed. If the rotational speed of the motor is the target speed, the motor outputs a signal indicating that the motor is stabilized at the target speed. Image formation processing is performed in response to the signal indicating that the motor is stabilized at the target speed.

12 Claims, 5 Drawing Sheets

MOTOR START EXAMINING DEVICE AND METHOD

BACKGROUND OF THE INVENTION

1. Field of the Invention

The present invention relates to a motor start examining device and method for examining, when the rotational speed of a motor is predetermined, a state from the time when the rotation of the motor is started to the time when the rotational speed of the motor reaches the predetermined rotational speed. More specifically, the present invention relates to a start examining device and method of a motor for driving a Polygonal mirror which is provided for an image forming apparatus or the like.

2. Description of the related art

In an image forming apparatus of a laser recording type such as a laser beam printer, a facsimile of a laser recording type and a digital copying machine of a laser recording type, an electrostatic latent image corresponding to an image to be formed is written into a photoreceptor by exposing and scanning the surface of the photoreceptor by a laser beam. The electrostatic latent image on the surface of the photoreceptor is developed into a toner image. The toner image is transferred onto paper sheets and is further fixed thereto, thereby to form an image.

A laser scanner for scanning the surface of the photoreceptor by the laser beam comprises a laser light source, a Polygonal mirror for reflecting the laser beam irradiated from the laser light source toward the photoreceptor, and a motor for rotating the Polygonal mirror at constant speed. The Polygonal mirror is rotated at constant speed so that a light path of the laser beam is changed, to expose and scan the photoreceptor.

In order to accurately write the image by the laser beam, the rotation of the motor must be rigidly controlled. That is, constant-speed rotation control of the motor for rotating the Polygonal mirror is carried out.

A control circuit for realizing the constant-speed rotation control of the motor comprises a stability detecting circuit for determining whether or not the motor is stabilized at a target rotational speed. The stability detecting circuit outputs a rotation stability signal when the rotational speed of the motor is the target rotational speed or a rotational speed within a predetermined allowable range centered around the target rotational speed (hereinafter also referred to as "target rotational speed").

At the time of starting the motor, power is supplied to the motor, the rotational speed of which is quickly raised to the target rotational speed. However, it is actually impossible to monotonously increase the rotational speed of the motor so that the motor is stabilized at the target rotational speed. Specifically, overshoot occurs before the motor is stabilized at the target rotational speed. Consequently, the rotation stability signal is intermittently outputted in a certain time period immediately after starting the motor. That is, the rotation stability signal chatters.

When the rotation stability signal chatters, the rotation of the motor is not-stabilized, so that the Polygonal mirror is not rotated at constant speed. Accordingly, laser light reflected from the Polygonal mirror in this state is distorted.

In the image forming apparatus of a laser recording type, therefore, the laser light source is caused to light up to start an image forming operation after an elapse of a waiting time since the motor for driving the Polygonal mirror was started.

In many cases the waiting time is set to a relatively longer time (for example, approximately 10 to 20 seconds) in consideration of the variation in the starting characteristics of each motor.

After an elapse of the waiting time, the image forming operation is quickly started. After the image forming operation is started, it is judged that a failure has occurred if the rotation stability signal indicating that the motor is being stably rotated at the target rotational speed is broken, whereby the image forming operation is stopped. The reason for this is that in a state where the rotation of the motor is not stabilized so that the rotational speed of the Polygonal mirror is changed, an image to be formed is distorted, thereby to make it impossible to reproduce a clear image.

A problem in such a technique is that the time required until the rotation of the motor is stabilized differs from one image forming apparatus to another, thereby to make it difficult to uniformly determine the waiting time.

More specifically, there are variations in characteristics for each control circuit and motor. Accordingly, the time required until the rotation of the motor is stabilized after starting the motor differs greatly from one image forming apparatus to another. In addition, the time required until the rotation of the motor is stabilized may, in some cases, be longer as the motor is used. If such variations in the time required until the rotation of the motor is stabilized for each image forming apparatus is taken into consideration, the waiting time may be set to the longest time. In this case, however, the waiting time required until the laser light source lights up to start image formation since the motor for driving the Polygonal mirror was started becomes significantly long.

On the other hand, if the waiting time is set to a relatively short time, the chattering of the motor may not, in some cases, completely subside even after an elapse of the waiting time. In this case, the image forming operation is started after the elapse of the waiting time. If the rotation stability signal is broken after the image forming operation is started, however, it is judged that a failure has occurred, whereby the image forming operation is interrupted. Particularly even when the rotation stability signal is slightly broken so that the distortion of an image formed, for example, is not a problem, the image forming operation is interrupted.

As still another method of control, it is also considered that the motor has been started earlier in consideration of the rise time of the motor. However, the driving time of the motor may, in some cases, be longer than necessary. The facsimile of a laser recording type is taken as an example. In this example, it is considered that the motor is started immediately after the receiving of an image is started. In the facsimile, however, it may, in some cases, take only several seconds and in the other cases, take 20 minutes to receive an image corresponding to one page. If the motor is started immediately after the receiving is started, therefore, the motor is uselessly rotated and driven. As a result, the life of the motor may be reduced.

SUMMARY OF THE INVENTION

An object of the present invention is to provide a motor start examining device and method for examining, when a motor whose rotational speed is to be determined is started, determining whether or not the rotational speed of the motor correctly reaches determined rotational speed within a predetermined time period after the rotation of the motor is started.

Another object of the present invention is to provide a motor start examining device and method for judging whether or not a motor has stabilized at a predetermined rotational speed within a short time period after the motor is started even if there are variations in the characteristics of a motor for driving a Polygonal mirror and the characteristics of a control circuit in an image forming apparatus of a laser recording type.

The device according to the present invention examines the rotating state of a motor immediately after starting the motor. The device comprises a timer, a speed detecting unit for detecting the rotational speed of the motor, a stability signal outputting circuit, and a judging circuit. The timer starts to measure time in response to the start of the supply of power to the motor, and output a time-up signal when it measures a predetermined rise time. The stability signal outputting circuit outputs a stability signal when the speed detected by the speed detecting unit is maintained in a predetermined relationship with a predetermined target speed. For example, the stability signal is outputted when the detected speed is in a speed range between a speed slightly higher than the target speed and a speed slightly lower than the target speed. The judging circuit determines whether the motor is stabilized at the target speed when the stability signal has outputted continuously for an examining time shorter than the rise time before the time-up signal is outputted from the timer.

In such construction, it can be judged whether or not the motor is stabilized at the target speed in a time period from the time when the supply of power to the motor is started to the time when the rise time elapses. The judgment is made depending on whether or not the stability signal is outputted continuously for the examining time, thereby to make it possible to make correct judgment within the rise time.

When the present invention is seen from another point of view, the judging circuit does not judge that the motor is stabilized at the target speed even if the stability signal is only continuously outputted during the examining time and then, waits until a predetermined waiting time has elapsed, and determines whether the motor is stabilized at the target speed if the stability signal has outputted even after an elapse of the waiting time.

When the present invention is seen from still another point of view, the judging circuit waits, when the stability signal is not outputted after an elapse of the waiting time, until a second waiting time has further elapsed, and determines whether the motor is stabilized at the target speed if the stability signal has outputted after an elapse of the second waiting time.

In the above described construction, it can be correctly judged whether or not the motor is stabilized at the target speed after at least the rise time and the waiting time have elapsed since power was supplied to the motor or after the second waiting time has further elapsed. Consequently, the time required to judge whether or not the motor is stabilized at the target speed may be shorter than the time conventionally required. In addition, it is possible to make correct judgment.

The foregoing and other objects, features, aspects and advantages of the present invention will become more apparent from the following detailed description of the present invention.

DESCRIPTION OF THE PREFERRED EMBODIMENTS

Figure 1:
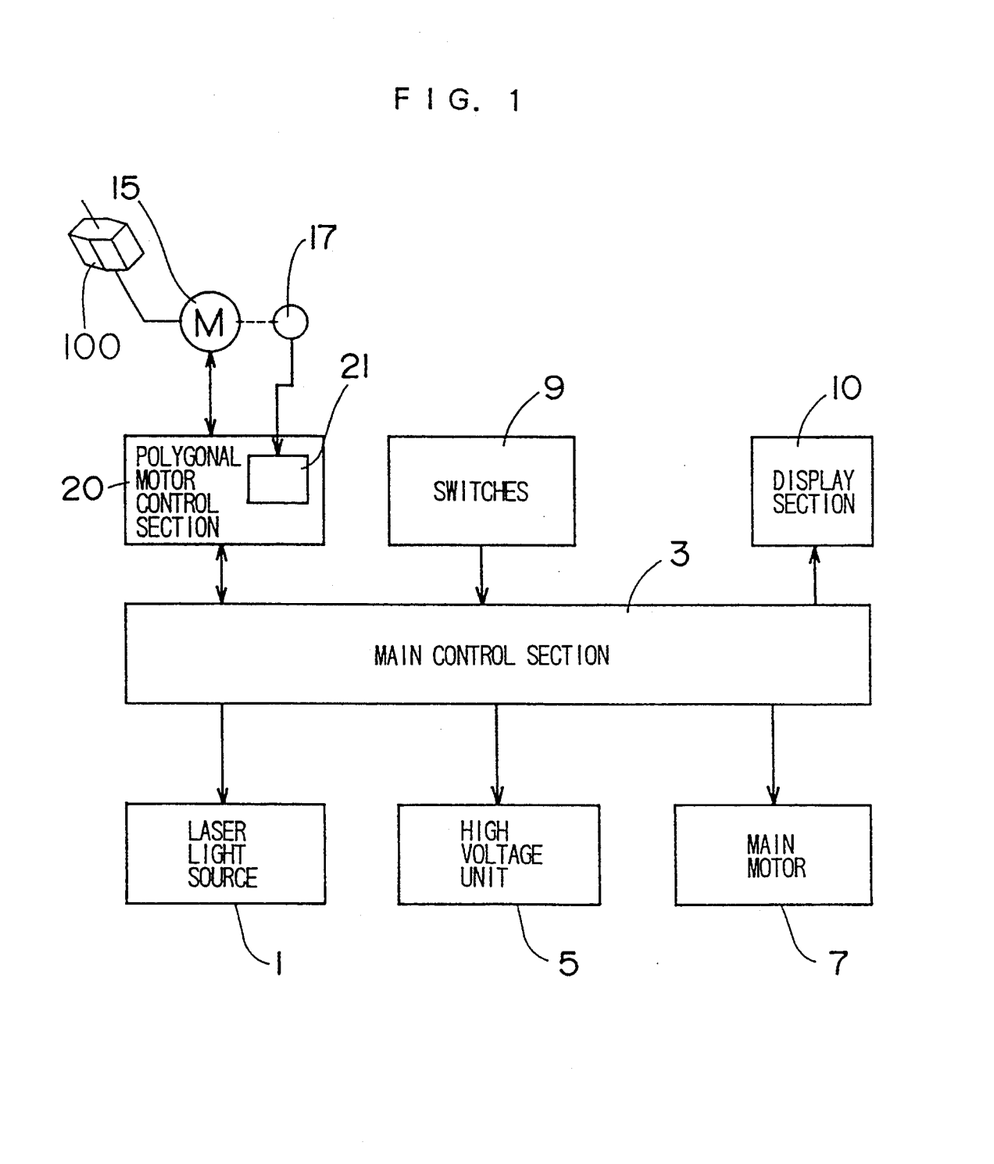
FIG. 1 is a block diagram showing the electrical construction of a laser beam printer incorporating one embodiment of the present invention.

FIG. 1 is a block diagram showing the electrical construction of a laser beam printer incorporating one embodiment of the present invention. In the laser beam printer, the surface of a photoreceptor uniformly charged is exposed and scanned by a laser beam, so that an electrostatic latent image is written into the surface of the photoreceptor. The electrostatic latent image is developed into a toner image. The toner image is transferred onto paper sheets and is further fixed thereto.

A laser light source 1 for generating the laser beam is controlled by a main control section 3 having a microcomputer provided in its inner part. A high voltage unit 5 for inducing discharges at high voltages so as to charge the surface of the photoreceptor, a main motor 7 for exerting a driving force to respective sections of the laser beam printer, a display section 10 for reporting the occurrence of a failure, for example, to a user, and various switches 9 are connected to the main control section 3. In addition, a Polygonal motor control section 20 is connected to the main control section 3. The Polygonal motor control section 20 controls the driving of a Polygonal motor 15. The Polygonal motor 15 rotates a Polygonal mirror 100 at constant speed.

The Polygonal mirror 100 is a mechanical polarizer. The Polygonal mirror 100 is in a prism shape having a plurality of side surfaces, and the side surfaces are mirror finished surfaces. The Polygonal mirror 100 reflects the laser beam generated from the laser light source 1 toward the photoreceptor. The Polygonal mirror 100 is rotated around its axis, whereby a light path of the laser beam leading to the photoreceptor from the Polygonal mirror 100 is changed at a uniform rate. Consequently, the surface of the photoreceptor is exposed and scanned.

A rotary encoder 17 for generating a signal having a frequency corresponding to the rotational speed of the Polygonal motor 15 is disposed in relation to the Polygonal motor 15. An output of the rotary encoder 17 is applied to a stability detecting circuit 21 for determining whether or not the Polygonal motor 15 is stabilized at a target rotational speed. The stability detecting circuit 21 is provided inside the Polygonal motor control section 20, and outputs a rotation stability signal when the rotational speed of the Polygonal motor 15 is within a range of the target rotational speed ± an allowable-rotational speed (hereinafter referred to as "target rotational speed"). The rotation stability signal is used for constant-speed control of the Polygonal motor 15 inside the Polygonal motor control section 20, and is also applied to the main control section 3 so as to judge whether or not a failure occurs in a laser scanner including the Polygonal mirror 100 or the like.

Figure 2:
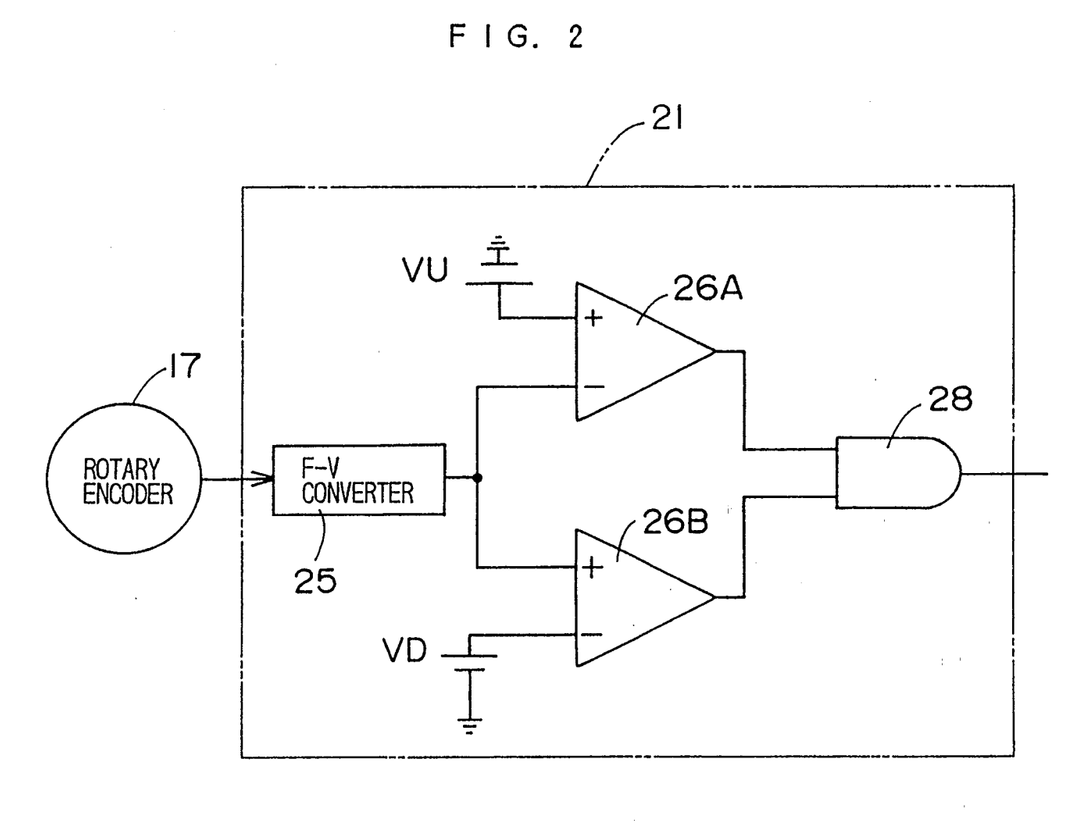
FIG. 2 is a block diagram showing the internal construction of a stability detecting circuit.

FIG. 2 is a block diagram showing the internal construction of the stability detecting circuit 21. An output signal of the rotary encoder 17 is converted into a voltage signal by a frequency-voltage (F-V) converter 25. Specifically, a voltage signal corresponding to the rotational speed of the Polygonal motor 15 is outputted from the frequency-voltage converter 25.

This voltage signal is inputted to an inverted input terminal of a comparator 26A and a non-inverted input terminal of a comparator 26B. The comparators 26A and 26B constitute a window comparator. That is, an upper-limit specified voltage VU is applied to the non-inverted input terminal of the comparator 26A, and a lower-limit specified voltage VD (VD<VU) is inputted to the inverted input terminal of the comparator 26B. Both outputs of the comparators 26A and 26B attain a high level, provided that the output voltage of the frequency-voltage converter 25 takes a value between the lower-limit specified voltage VD and the upper limit specified voltage VU.

Respective output signals of the pair of comparators 26A and 26B are inputted to an AND gate 28. An output of the AND gate 28 attains a high level when the outputs of the comparators 26A and 26B are at a high level. The output signal at a high level of the AND gate 28 becomes the above described rotation stability signal.

The upper-limit specified voltage VU applied to the comparator 26A and the lower-limit specified voltage VD applied to the comparator 26B respectively correspond to the upper limit and the lower limit Of the target rotational speed of the Polygonal motor 15. That is, the output voltage of the frequency-voltage converter 25 in a case where the Polygonal motor 25 is rotated at the upper limit of the target rotational speed is equal to the upper-limit specified voltage VU. Similarly, the output voltage of the frequency-voltage converter 25 in a case where the Polygonal motor 15 is rotated at the lower limit of the target rotational speed is equal to the lower-limit voltage VD. Therefore, the rotation stability signal (the output signal at a high level of the AND gate 28) is outputted, provided that the rotational speed of the Polygonal motor 15 is within the range of the target rotational speed.

Figure 3:
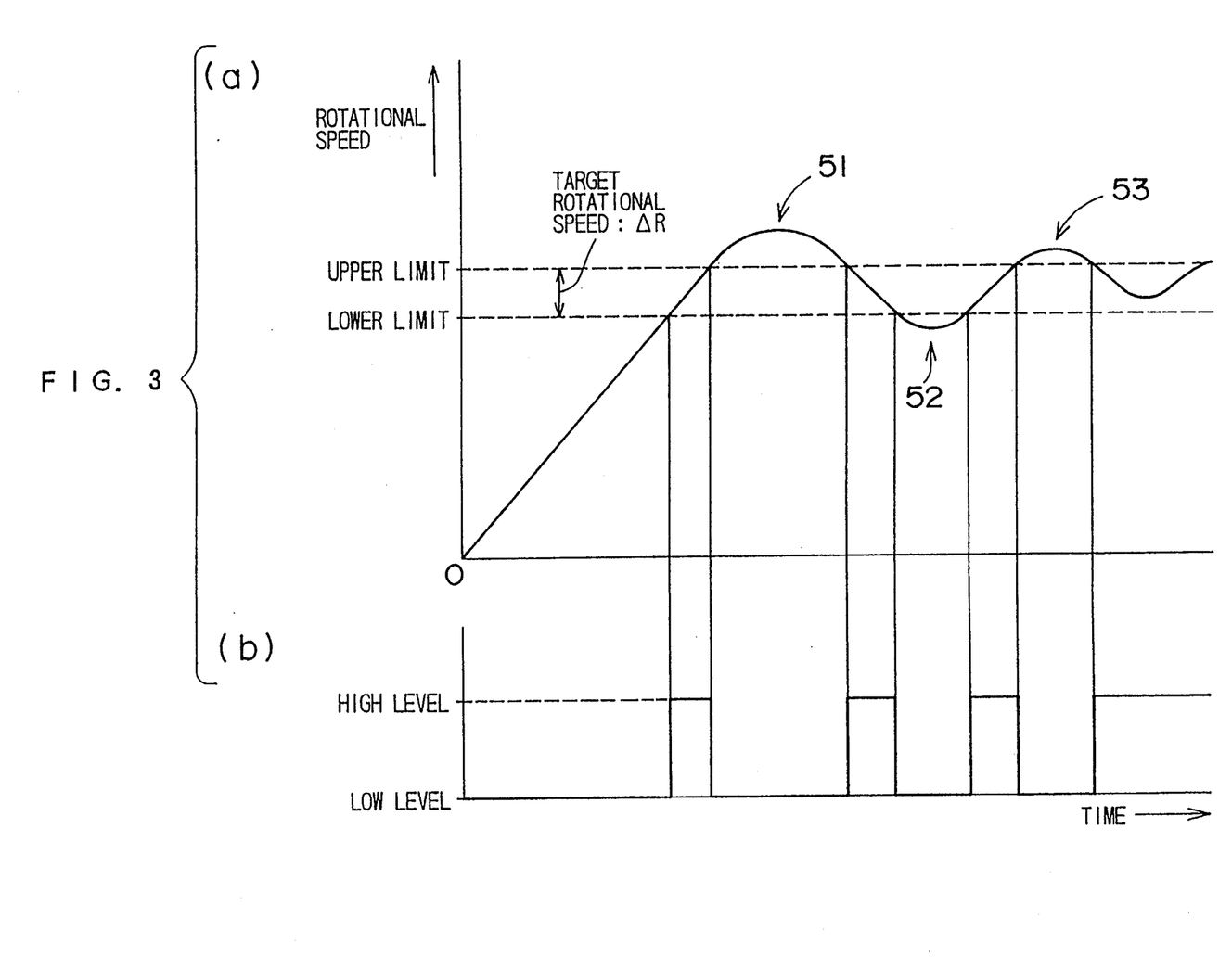
FIG. 3 is a waveform diagram for explaining an operation immediately after starting a motor.

FIG. 3 is a waveform diagram for explaining an operation immediately after starting the Polygonal motor 15, where (a) shows the rise waveform of the rotational speed of the Polygonal motor 15, and (b) shows the waveform of the output signal of the stability detecting circuit 21 (the output signal of the AND gate 28). When the Polygonal motor 15 is started, power is supplied to the Polygonal motor 15 from the Polygonal motor control section 20. Correspondingly, the rotational speed of the Polygonal motor 15 is quickly raised. The rotational speed of the Polygonal motor 15 gradually converges at a value within a target rotational speed ΔR while causing overshoot represented by reference numerals 51, 52 and 53.

The output signal of the stability detecting circuit 21 attains a high level in a time period during which the rotational speed of the Polygonal motor 15 takes a value within the target rotational speed ΔR, while attaining a low level in the remaining time period, as shown in (b). As the rotational speed of the Polygonal motor 15 converges at the value within the target rotational speed ΔR, the pulse width of the rotation stability signal (the length of the time period during which the output signal of the stability detecting circuit 21 is at a high level) is gradually increased.

Figure 4:
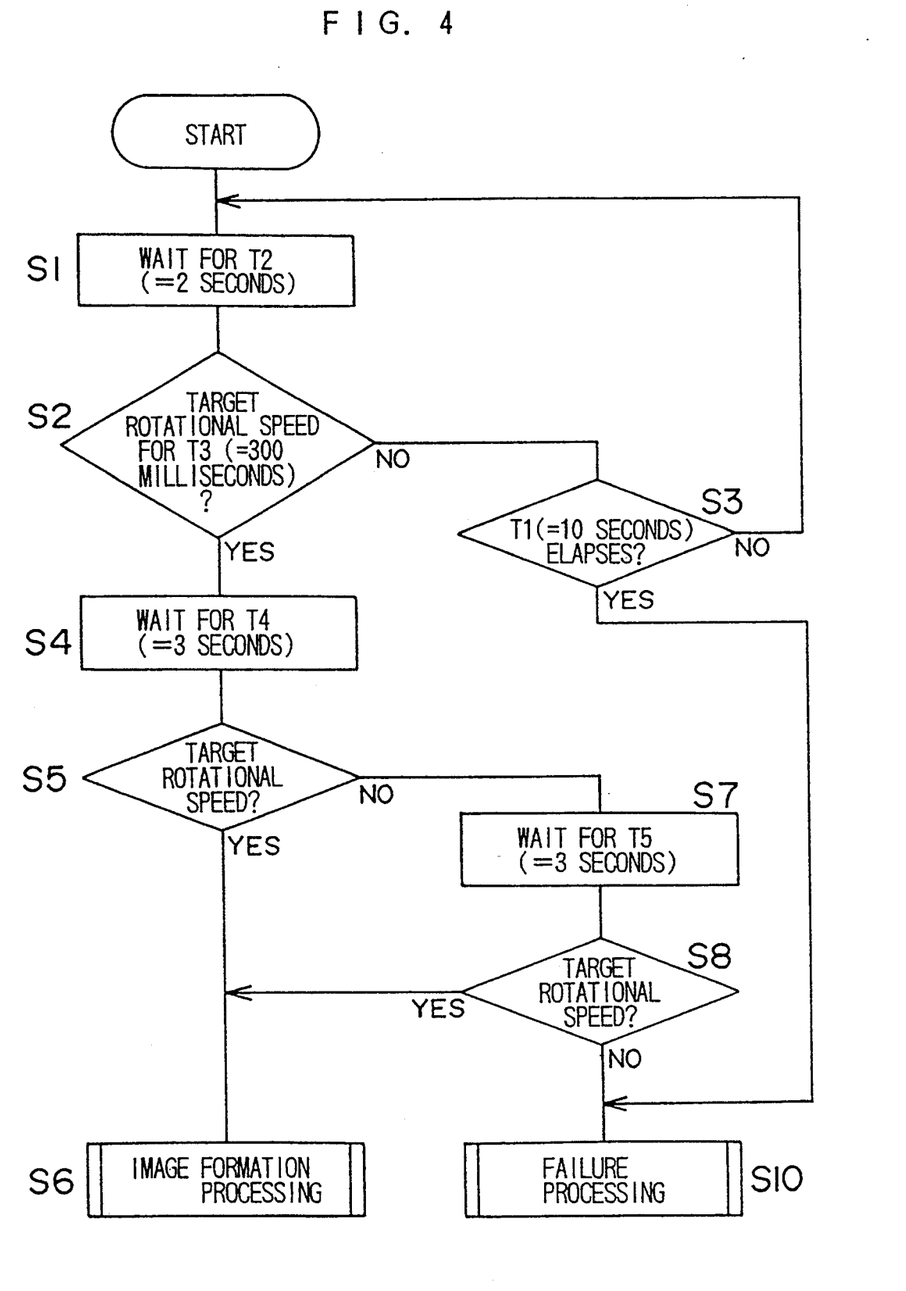
FIG. 4 is a flow chart for explaining one example of processing performed in a main control section immediately after starting the motor.

FIG. 4 is a flow chart for explaining one example of processing performed in the main control section 3 when the Polygonal motor 15 is started so as to judge whether or not the laser scanner is normal. When the Polygonal motor 15 is started, it is judged whether or not the rotational speed of the Polygonal motor 15 is the target rotational speed in a time period to the time when a first time T1 (for example, 10 seconds) has elapsed every other second time T2 (for example, 2 seconds) continuously for a third time T3 (for example, 300 milliseconds) (steps S1, S2 and S3). That is, it is judged whether or not the pulse value of the rotation stability signal is not less than 300 milliseconds every two seconds in a time period of 10 seconds after the start. Unless the rotation stability signal having a pulse width of not less than 300 milliseconds is detected before the first time T1 (10 seconds) elapses (YES in the step S3), failure processing is performed (step S10). The failure processing is processing for, for example, displaying the occurrence of a failure on the display section 10 to report the occurrence of the failure to a user without performing an image forming operation.

If it is judged that a state where the rotational speed of the Polygonal motor 15 is the target rotational speed is continued for the third time T3, it is judged that the rotation of the Polygonal motor 15 is stabilized. In the step S4, the Polygonal motor control section 20 waits until a fourth time T4 (for example, 3 seconds) has elapsed. It is judged again in the step S5 whether or not the rotational speed of the Polygonal motor 15 is within the range of the target rotational speed (that is, the rotation stability signal is outputted). Consequently, it is confirmed whether the Polygonal motor 15 is stabilized at the target rotational speed. If it is judged that the rotational speed of the Polygonal motor 15 is the target rotational speed, image formation processing is started (step S6). The image formation processing is processing of, for example, driving the laser light source 1, driving the photoreceptor and supplying paper sheets.

On the other hand, when it is judged in the step S5 that the rotational speed of the Polygonal motor 15 is not the target rotational speed, the Polygonal motor control section 20 waits for only a fifth time T5 (for example, 3 seconds) (step S7), after which it is judged again whether or not the rotational speed of the Polygonal motor 15 is the target rotational speed (step S8). When it is judged that the rotational speed of the Polygonal motor 15 is not the target rotational speed either by this judgment, the failure processing is performed (step S10). On the other hand, if it is judged that the rotational speed of the Polygonal motor 15 is the target rotational speed, the image formation processing (step S6) is performed.

For example, if a rise time elapsed from the time when the driving of the Polygonal motor 15 is started until the Polygonal motor 15 is stabilized at the target rotational speed is short, the pulse width of the rotation stability signal is quickly increased. Therefore, processing performed by the main control section 3 quickly exits from a loop in the steps S1 to S3, to start the image formation processing through the processing in the steps S4 and S5. On the other hand, even when the rise time elapsed until the Polygonal motor 15 is stabilized at the target rotational speed is relatively long, it is not judged that a failure occurs if the pulse width of the rotation stability signal reaches 300 milliseconds within 10 seconds. If the Polygonal motor 15 is stabilized at the target rotational speed after an elapse of 3 seconds, the image formation processing is performed. In addition, even when the Polygonal motor 15 is not stabilized at the target rotational speed within 3 seconds after the pulse width of the rotation stability signal reaches 300 milliseconds, the Polygonal motor control section 20 further waits for 3 seconds (step S7). It is judged which of the image formation processing and the failure processing is performed after examining again whether or not the rotational speed of the Polygonal motor 15 is the target rotational speed.

Furthermore, if not less than 10 seconds is required for the pulse width of the rotation stability signal to reach 300 milliseconds or not less than 6 seconds (T4+T5) is required from the time when the pulse width of the rotation stability signal reaches 300 milliseconds to the time when the Polygonal motor 15 is stabilized at the target rotational speed, the failure processing is performed, assuming that an abnormality arises in the laser scanner.

As described in the foregoing, according to the example of processing, if the rise time elapsed until the rotational speed of the Polygonal motor 15 reaches the target rotational speed is short, it is possible to quickly start the image forming operation. Even when the rise time becomes relatively longer due to the variations in the characteristics of the Polygonal motor 15 and the other components and the change with time, the image forming operation is performed, provided that the rotation of the Polygonal motor 15 can be stabilized. Consequently, it is possible to prevent a useless waiting time from being required before the image forming operation is started and prevent unnecessary failure processing from being performed.

Furthermore, in the example of processing, it is not judged continuously from beginning to end whether or not the rotational speed of the Polygonal motor 15 is the target rotational speed. Specifically, the judgment in the step S2 is made every two seconds, and the judgment in the steps S5 and S8 is made at time intervals of 3 seconds. Consequently, the time required for the main control section 3 to perform the above described judgment processing may be significantly short. Therefore, the above described judgment processing does not impose the great burden on the main control section 3. Consequently, it is possible to carry out good control of the Polygonal motor 15 without imposing the great burden on the main control section 3.

Figure 5:
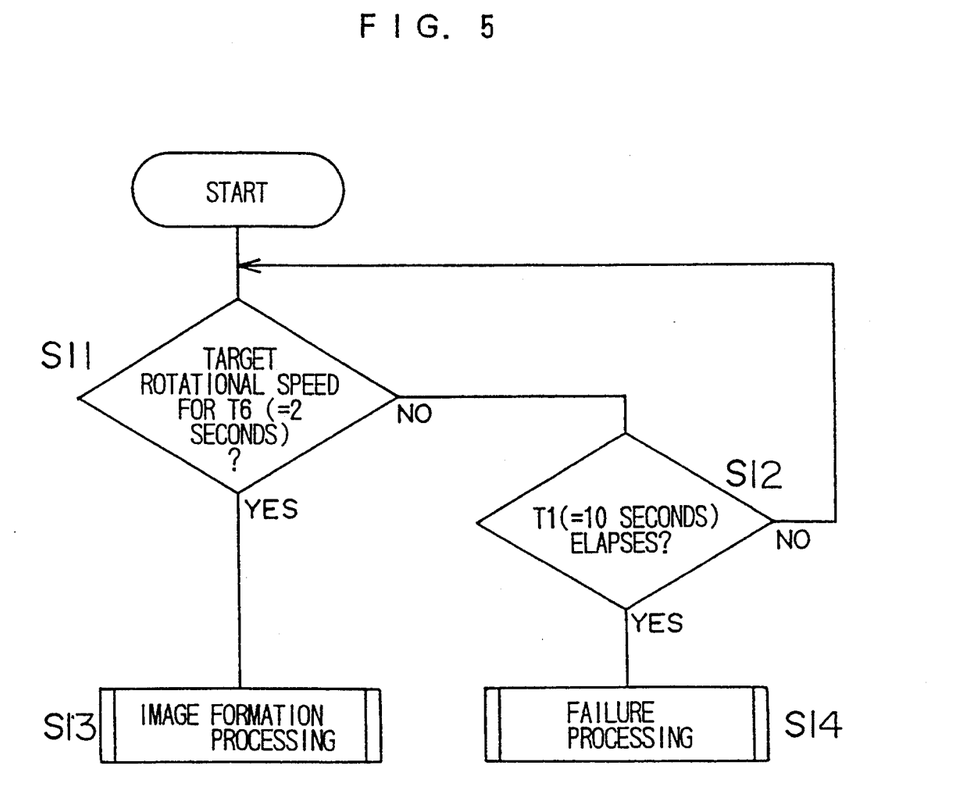
FIG. 5 is a flow chart for explaining another example of processing performed in the main control section immediately after starting the motor.

FIG. 5 is a flow chart for explaining another example of processing performed in the main control section 3 when the Polygonal motor 15 is started so as to judge whether or not the laser scanner is normal. If the Polygonal motor 15 is stated, it is judged whether or not the rotational speed of the Polygonal motor 15 reaches the target rotational speed in a time period to the time when the first time T1 (for example, 10 seconds) has elapsed continuously for a sixth time T6 (for example 2 seconds) (steps S11 and S12). That is, the Polygonal motor 15 is monitored to determine whether or not the pulse width of the rotation stability signal is not less than 2 seconds in a time period of 10 seconds after the start. Unless the rotation stability signal having a pulse width of not less than 2 seconds is detected before the first time T1 elapses (step S12), the failure processing is performed (step S14).

If it is judged in the step S12 that a state where the rotational speed of the Polygonal motor 15 is the target rotational speed is continued for the sixth time T6, the image formation processing is started, assuming that the rotation of the Polygonal motor 15 is stabilized (step S13).

For example, if the rise time elapsed from the time when the driving of the Polygonal motor 15 is started until the Polygonal motor 15 is stabilized at the target rotational speed is short, the pulse width of the rotation stability signal is quickly increased. Therefore, the processing performed by the main control section 3 quickly exits from a loop in the steps S11 and S12, to start the image formation processing.

On the other hand, even when the rise time elapsed until the Polygonal motor 15 is stabilized at the target rotational speed is relatively long, it is not judged that a failure occurs if the pulse width of the rotation stability signal reaches 2 seconds within 10 seconds, to start the image formation processing.

Furthermore, if not less than 10 seconds is required for the pulse width of the rotation stability signal to be not less than 2 seconds, the failure processing is performed, assuming that an abnormality occurs fin the laser scanner.

As described in the foregoing, also in the example of processing, if the rise time elapsed until the rotational speed of the Polygonal motor 15 is raised to the target rotational speed is short, it is possible to quickly start the image forming operation. Further, even when the rise time becomes relatively longer due to the variations in the characteristics of the Polygonal motor 15 and the other components and the change with time, the image forming operation is performed, provided that the rotation of the Polygonal motor 15 can be stabilized. Consequently, it is possible to prevent a useless waiting time from being required before the image forming operation is started and prevent unnecessary failure processing from being performed.

Although description was made of the embodiment of the present invention, the present invention is not limited to the above described embodiment. For example, although description was made taking a laser beam printer as an example, the present invention is easily applicable to an image forming apparatus using a laser scanner such as a facsimile of a laser recording type or a digital copying machine of a laser recording type in addition to the laser beam printer.

Furthermore, the present invention is applicable to not only the image forming apparatus but also an arbitrary apparatus in which constant-speed control of a motor must be carried out at a predetermined rotational speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor start examining device for examining a rotating state of a motor immediately after starting the motor, said motor start examining device comprising:

a timer for starting to measure time in response to the start of a supply of power to the motor, to output a time-up signal when said timer measures a predetermined first time period;

speed detecting means for detecting a rotational speed of the motor;

means for outputting a stability signal when the rotational speed detected by the speed detecting means is maintained in a predetermined relationship with a predetermined target speed;

first judging means for judging whether said stability signal is outputted, said first judging means making a judgment every other second time period, which second time period is sufficiently shorter than the first time period, said first judgment occuring before the time-up signal is outputted from said timer, said first judging means outputting signal when the stability signal is outputted continuously for a predetermined third time period which is sufficiently shorter than the second time period;

second judging means which waits until a fourth time period has elapsed since the signal from the first judging means was outputted, for judging whether said stability signal is outputted after an elapse of the fourth time period; and third judging means for judging whether the motor is stabilized at the target speed in response to a judgement of the second judging means that the stability signal has been outputted.

2. The motor start examining device according to claim 1, further comprising:

fourth judging means which waits, in the event that said second judging means judges that the stability signal has not been outputted, until a fifth time period has further elapsed since the judgement for judging whether the stability signal is outputted; and fifth judging means for judging whether the motor is stabilized at the target speed in response to the judgment of the fourth judging means indicating that the stability signal is outputted.

3. The motor start examining device according to claim 1, wherein said stability signal is outputted when the detected speed is within a speed range between a speed slightly higher than the target speed and a speed slightly lower than the target speed.

4. The motor start examining device according to claim 2, wherein said stability signal is outputted when the detected speed is within a speed range between a speed slightly higher than the target speed and a speed slightly lower than the target speed.

5. A motor start examining device for examining a rotating state of a motor immediately after starting the motor, said motor start examining device comprising:

a timer for starting to measure time in response to the start of a supply of power to the motor in order to output a time-up signal when the time measures a predetermined rise time;

speed detecting means for detecting a rotational speed of the motor;

means for outputting a stability signal when the rotational speed detected by the speed detecting means is maintained in a predetermined relationship with a predetermined target speed; and judging means for judging whether the motor is stabilized at the target speed when said stability signal is outputted continuously for an examining time, which examining time is shorter than the predetermined rise time before the time-up signal outputted from said timer.

6. The motor start examining device according to claim 5, wherein said stability signal is outputted when the detected speed is within a speed range between a speed slightly higher than the target speed and a speed slightly lower than the target speed.

7. The motor starting examining device according to claim 6, wherein said judging means judges whether the stability signal is outputted, which judging occurs every other interval time, which interval time is sufficiently shorter than the predetermined rise time 8. The motor starting examining device according to claim 7, wherein said examining time is sufficiently shorter than said interval time.

9. The motor starting examining device according to claim 8, wherein said judging means further comprises additional judging means which additional judging means waits until a predetermined waiting time has elapsed when the stability signal was outputted continously for said examining time for determining whether the motor has stabilized at the target speed if the stability signal is outputted after an elapse of the waiting time.

10. The motor starting examining device according to claim 9, wherein said additional judging means further waits until a predetermined second waiting time has elapsed if said stability signal is not outputted after an elapse of said waiting time for determining whether the motor has stabilized at the target speed if the stability signal is outputted after the elapse of the second waiting time.

11. The motor starting examining device according to claim 9, wherein said motor is a motor for driving a Polygonal mirror in an image forming apparatus, image formation processing being started if at least one of said judging means and said additional judging means judges than the motor is stabilized at the target speed.

12. A method of examining a rotating state of a motor immediately after starting the motor, comprising the steps of:

first judging whether or not a rotational speed of the motor is a target speed during a time period from the time when a supply of power to the motor is started to the time when a first timer period elapses every other second time period, which second time period is sufficiently shorter than the first time period, continuously for a third time period, which third time period is sufficiently shorter than the second time period;

second judging, when a judgement in made by the first judging than the rotational speed of the motor is the target speed, whether the rotational speed of the motor is the target speed again after an elapse of a fourth time period, and outputting a signal indicating that the motor is stabilized at the target speed if the rotational speed of the motor is the target speed, while further waiting until a fifth time period has elapsed, if the rotational speed of the motor is not the target speed, and judging whether the rotational speed of the motor is the target speed, to output a signal indicating that the motor is stabilized at the target speed if the rotational speed of the motor is the target speed.

* * * * *